(12) United States Patent
Cao et al.

(10) Patent No.: US 10,645,299 B2
(45) Date of Patent: May 5, 2020

(54) METHOD FOR TRACKING AND SHOOTING MOVING TARGET AND TRACKING DEVICE

(71) Applicant: GOERTEK INC., Weifang, Shandong (CN)

(72) Inventors: Weiyu Cao, Weifang (CN); Xiang Chen, Weifang (CN); Dachuan Zhao, Weifang (CN)

(73) Assignee: GOERTEK INC., Weifang (CN)

( * ) Notice: Subject to any disclaimer, the term of this patent is extended or adjusted under 35 U.S.C. 154(b) by 77 days.

(21) Appl. No.: 15/756,545

(22) PCT Filed: Jul. 31, 2017

(86) PCT No.: PCT/CN2017/095247
§ 371 (c)(1),
(2) Date: Feb. 28, 2018

(87) PCT Pub. No.: WO2018/232837
PCT Pub. Date: Dec. 27, 2018

(65) Prior Publication Data
US 2019/0281224 A1 Sep. 12, 2019

(30) Foreign Application Priority Data
Jun. 23, 2017 (CN) .......................... 2017 1 0488228

(51) Int. Cl.
*H04N 5/232* (2006.01)
*G06T 7/73* (2017.01)
*G06T 7/246* (2017.01)

(52) U.S. Cl.
CPC ......... *H04N 5/23299* (2018.08); *G06T 7/246* (2017.01); *G06T 7/73* (2017.01);
(Continued)

(58) Field of Classification Search
CPC .. H04N 5/23299; H04N 5/23203; G06T 7/73; G06T 2207/30244
See application file for complete search history.

(56) References Cited

U.S. PATENT DOCUMENTS 6,687,386 B1   2/2004 Ito et al.
2002/0159627 A1*  10/2002 Schneiderman ..... G06K 9/3241
                                                            382/154
(Continued)

FOREIGN PATENT DOCUMENTS

CN   1477599 A    2/2004
CN   102663777 A  9/2012
(Continued)

OTHER PUBLICATIONS

Ru-qiang et al., "SURF Algorithm and Its Detection Effect on Object Tracking", vol. 26, No. 3, Sep. 2011.
(Continued)

*Primary Examiner* — Abdelaaziz Tissire
(74) *Attorney, Agent, or Firm* — Maschoff Brennan (57) ABSTRACT

The present application provides a method for tracking and shooting a moving target and a tracking device, firstly, feature points of a template image corresponding to each shooting angle is extracted in advance, after that, only a feature point of a currently shot target image needs to be calculated when matching, and then the feature points of the target image is matched with the feature points of the template image corresponding to each shooting angle, the shooting angel corresponding to the matched template image is determined as the shooting angle of the currently shot target image; if the shooting angel of the currently shot target image does not coincide with the preset shooting angle of the target, the tracking device is moved to track and shoot the target, so that the shooting angel of the target coincides with the preset shooting angle of the target, greatly reducing (Continued)

the calculation amount of the detection and matching of the feature point and improving the real-time performance of the tracking and shooting.

15 Claims, 4 Drawing Sheets

(52) U.S. Cl.
CPC ......... *H04N 5/232* (2013.01); *H04N 5/23203* (2013.01); *G06T 2200/28* (2013.01); *G06T 2207/10016* (2013.01); *G06T 2207/30244* (2013.01)

(56) References Cited

U.S. PATENT DOCUMENTS

| | | | | |
|---|---|---|---|---|
| 2009/0279741 | A1* | 11/2009 | Susca | G06T 7/246 382/107 |
| 2014/0314322 | A1* | 10/2014 | Snavely | G06K 9/00664 382/190 |
| 2015/0049955 | A1* | 2/2015 | Stoeffler | G06K 9/6202 382/220 |
| 2016/0012593 | A1* | 1/2016 | Chao | G06K 9/4604 382/209 |
| 2016/0350904 | A1* | 12/2016 | Zhang | G06T 17/00 |
| 2018/0338083 | A1* | 11/2018 | Trevor | H04N 5/23267 |

FOREIGN PATENT DOCUMENTS

| | | |
|---|---|---|
| CN | 10292988 A | 2/2013 |
| CN | 10292988 B | 3/2015 |

OTHER PUBLICATIONS

International Search Report in Application No. PCT/CN2017/095247 dated Mar. 7, 2018.

CN Office Action in Application No. 201710488228.3 dated Mar. 4, 2019.

* cited by examiner

Figure 1

|    |    | 16 | 1  | 2  |    |    |
|----|----|----|----|----|----|----|
|    | 15 | 6' | 1  | 2  | 3  |    |
| 14 | 5' | 4' | 1  | 2  | 3  | 4  |
| 13 | 4' | 3' | P  | 3  | 4  | 5  |
| 12 | 3' | 2' | 1' | 4  | 5  | 6  |
|    | 11 | 2' | 1' | 6  | 7  |    |
|    |    | 10 | 9  | 8  |    |    |

METHOD FOR TRACKING AND SHOOTING MOVING TARGET AND TRACKING DEVICE

CROSS-REFERENCE TO RELATED APPLICATIONS

This application is the U.S. national stage of International Application No. PCT/CN2017/095247, filed Jul. 31, 2017, which claims priority to Chinese Patent Application No. 201710488228.3, filed Jun. 23, 2017. The foregoing applications are incorporated herein by reference.

TECHNICAL FIELD OF THE INVENTION

The present application relates to the field of a visual tracking technique, and more particularly to a method for tracking and shooting a moving target and a tracking device.

TECHNICAL BACKGROUND OF THE INVENTION

The detection and tracking of a moving target has always been a core technical issue studied in computer vision, pattern recognition and other fields. The key to the detection and tracking of the moving target is to use a computer vision technique and a pattern recognition classification method to detect the moving target in a video sequence image, and to effectively and stably track a target area. For example, in an intelligent transportation system, an accident vehicle may be automatically tracked and monitored by tracking the moving target; in home intelligent entertainment equipment, the automatic tracking of a moving human body may be controlled; in a military field, a weapon may be precisely guided, and so on.

When the present computer vision technique is used to identify and position a target and analyze the movement of the target, it is necessary to first perceive a surrounding environment, obtain depth information, establish a 2D or 3D map, and then search an optimal route through an algorithmic planning. However, for the tracking and shooting conditions of a known target image, the target and the environment are identified with a camera at the same time to plan a path, this has too much data calculation amount and makes a processor's resource allocation inadequate. For an auto-shooting mode with a very high real-time requirement, this method of planning the path is likely to cause the delay in tracking the device.

SUMMARY OF THE PRESENT INVENTION

An embodiment of the present application provides a method for tracking and shooting a moving target and a tracking device, which may improve the real-time performance of the tracking and shooting of the moving target.

An embodiment of the present application provides a method for tracking and shooting a moving target, including,
  extracting feature points of a currently shot target image;
  matching the feature points of the target image with pre-extracted feature points of a template image corresponding to each shooting angle, determining the template image having the maximum matching feature points as a matched template image matching the target image;
  determining the shooting angel corresponding to the matched template image as the shooting angle of the currently shot target image;
  if the shooting angel of the currently shot target image does not coincide with the preset shooting angle of the target, moving the tracking device to track and shoot the target, so that the shooting angel of the target coincides with the preset shooting angle of the target.

Optionally, before the matching the feature points of the target image with the pre-extracted feature points of the template image corresponding to each shooting angle, the method includes:
  shooting the target from a plurality of the shooting angles in advance, obtaining the template image corresponding to each shooting angle, and extracting the feature points of the template image corresponding to each shooting angle.

Optionally, the method further includes:
  presetting a first position area of the target image on a screen of the tracking device according to each shooting parameter of the tracking device, so that the shooting effect of the target image is optimal when the target image is located in the first position area,
  comparing the feature points of the target image with the feature points of the matched template image, determining a matched feature point located in the upper left corner and a matched feature point located in the lower right corner;
  taking a straight line between the matched feature point located in the upper left corner and the matched feature point located in the lower right corner as a diagonal line of a second position area, to determine the second position area of which the shape includes a quadrilateral, and taking the center point of the diagonal line as the center point of the second position area, the second position area being the current position area of the target image on the screen of the tracking device.

Optionally, the method further includes:
  comparing the number of pixels of the target image with the preset maximum threshold value of the number of pixels and the preset minimum threshold value of the number of pixels, moving backward the tracking device when determining that the number of the pixels of the target image is larger than the maximum threshold value of the number of the pixels, wherein moving forward the tracking device when determining that the number of the pixels of the determined target image is smaller than the minimum threshold value of the number of the pixels, so that the number of the pixels of the target image is smaller than the maximum threshold value of the number of the pixels and is larger than the minimum threshold value of the number of the pixels; and/or
  moving the tracking device such that the center point of the second position area is located within a first position area, when the center point of the second position area is not within the first position area.

The present application also provides a tracking device for tracking and shooting a moving target, including a camera for shooting a target image and further including a processor and a memory;
  the memory is configured to store a program for supporting the tracking device to perform the method for tracking and shooting the moving target, the program includes one or more computer instructions, the one or more computer instructions are invoked and executed by the processor;
  when the processor is configured to execute the program stored in the memory, the following steps may be performed:
  extracting feature points of a currently shot target image;
  matching the feature points of the target image with pre-extracted feature points of a template image corresponding to each shooting angle, determining the template image having the maximum matched feature points as the template image matching the target image, determining a shooting angel corresponding to the matched template image as a shooting angle of the currently shot target image, sending a movement instruction to a mobile device if the shooting angle of the currently shot target image does not coincide with the preset shooting angle of the target; enabling the mobile device to move the tracking device to track and shoot a target according to the movement instruction, so that the shooting angle of the target coincides with the preset shooting angle of the target.

An embodiment of the present application aims at reducing the amount of calculation of image matching, firstly, the feature points of the template image corresponding to each shooting angle is extracted in advance, after that, only feature points of a currently shot target image needs to be calculated when matching, and then the feature points of the target image is matched with the feature points of the template image corresponding to each shooting angle, the shooting angel corresponding to the matched template image is determined as the shooting angle of the currently shot target image; the tracking device is moved to track and shoot the target if the shooting angle of the currently shot target image does not coincide with the preset shooting angle of the target, so that the shooting angle of the target coincides with the preset shooting angle of the target, greatly reducing the calculation of the detection and matching of the feature point and improving the real-time performance of the tracking and shooting.

BRIEF DESCRIPTION OF THE DRAWINGS

In order to more clearly illustrate the embodiments of the present application or the technical solution in the prior art, the following drawings, which are intended to be used in the description of the embodiments or the prior art, are briefly described. It is obvious that the drawings in the following description are some embodiments of the present application. Other drawings may be obtained by those skilled in the art without providing the inventive work according to these drawings.

EMBODIMENTS OF THE PRESENT INVENTION

In order that the objective, technical solution and advantages of the embodiments of the present application are clearer, the technical solutions in the embodiments of the present application will be described clearly and completely in the following description in conjunction with the accompanying drawings in the embodiments of the present application, obviously, the described embodiments are a part of the embodiments of the utility model but not all embodiments thereof. All other embodiments obtained by those skilled in the art without any inventive work are within the scope of the present application, based on the embodiments of the present application.

Figure 1:
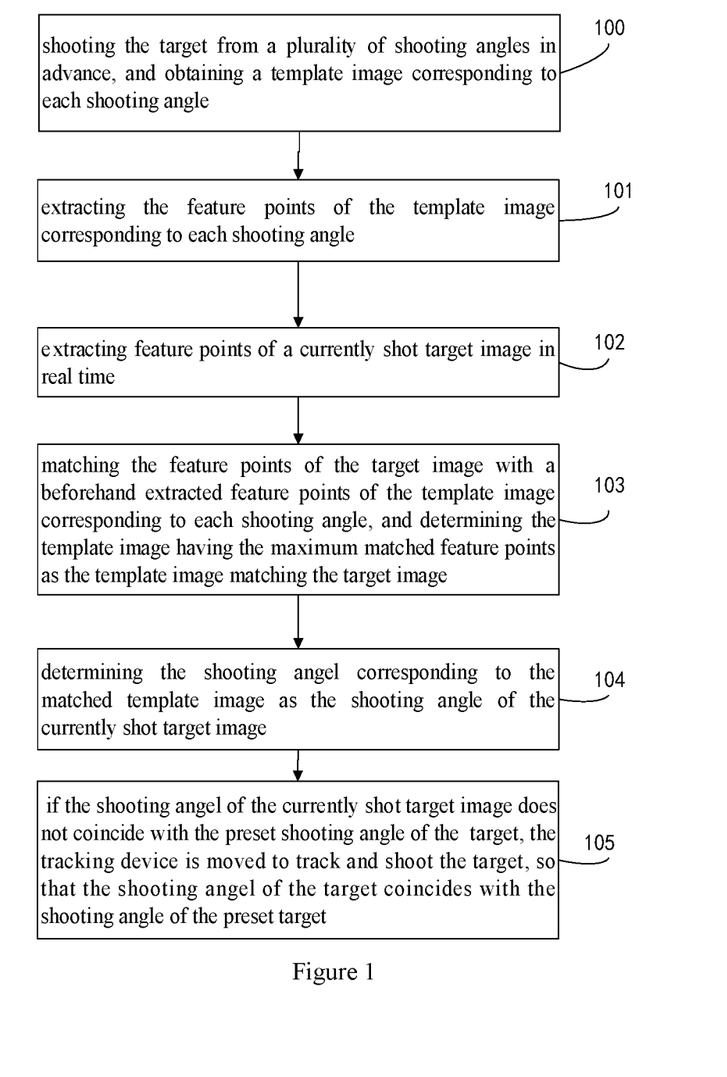
FIG. 1 is a flow diagram of a method for tracking and shooting a moving target provided in an embodiment of the present application.

FIG. 1 is a flow diagram of a method for tracking and shooting a moving target provided in an embodiment of the present application, as shown in FIG. 1, the method includes:

100: shooting the target from a plurality of shooting angles in advance, and obtaining template images corresponding to each shooting angle;

In the prior art, in order to determine the shooting angle of the currently shot target, it is common to extract and match feature points of continuously shot images according to chronological order, and thus to determine the shooting angle of the moving target. In this way, it is needed to extract feature points for each real-time shot image, which has very large calculation amount, therefore causing the lag of the tracking and shooting and having poor real-time performance.

Therefore, in an embodiment of the present application, in order to improve the real-time performance of the tracking and shooting and reduce the calculation amount of the image matching, the target may be shot from a plurality of shooting angles in advance to obtain a template image corresponding to each shooting angle. For example, the shooting angles where the target is at the right side and the left side of and in the middle of the tracking device.

Table 1 is the corresponding relationship between a template image and a shooting angle:

| Template image 1 | Shooting angle at the right side |
| Template image 2 | Shooting angle at the left side |
| Template image 3 | Shooting angle in the middle |

101: extracting the feature points of the template image corresponding to each shooting angle.

Figure 2:
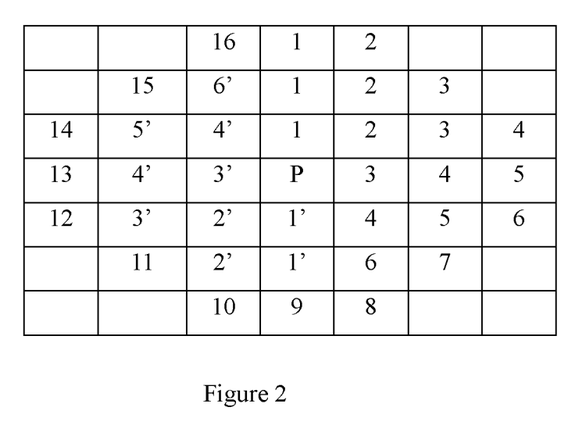
FIG. 2 is a diagram of a circular area with a radius of 3 and the center of a point P to be measured of the present application.

For the detailed implementation, the template image corresponding to each shooting angle is converted into a grayscale, the gray value of each point on the grayscale is calculated, for example, the improved FAST algorithm is used to detect the feature point; as shown in FIG. 2, for a circle with the center of a point P to be measured and the radius of 3, 16 pixels on the circle are marked with 1, 2 . . . 15, 16, respectively; let the gray value of the point P to be measured be Ip, let the gray value of each pixel on the circle be Ix, let the threshold value of the gray scale be t, let the set formed by consecutive N pixels on the circumference be S, where x=1, 2 . . . 15, 16, N=9;

If any pixel x on a circumference meets the conditions: $\forall x \in S, I_x > I_p + t$ or $\forall x \in Z, I_x < I_p - t$, the point P to be measured is taken as a symmetrical point, the points in the circle is divided into a symmetrical point pair di-di', if the point pair di-di' meets the conditions |Ip−di|<t and |Ip−di'|<t, the point P to be measured is a corner point, that is, the feature point, otherwise, it is not.

If any pixel on the circumference does not meet the conditions: $\forall x \in S, I_x > I_p + t$ or $\forall x \in S, I_x < I_p - t$, next point to be measured is selected.

Finally, the feature points detected in each template image corresponding to each shooting angle are saved in a corresponding feature point library.

Table 2 is the corresponding relationship between a template image and a feature point library:

| Template image 1 | Feature point library 1 |
| --- | --- |
| Template image 2 | Feature point library 2 |
| Template image 3 | Feature point library 3 |

102: extracting feature points of a currently shot target image in real time;

After the template image corresponding to each shooting angle and the corresponding feature point library are preset, the tracking device may track and shoot the moving target, when the target is moved, in order to determine the current shooting angle for the target, it is necessary to extract the feature points of the currently shot target image, the detailed realization may refer to the algorithm shown in FIG. 2 to detect the feature points, and will not be described again here.

103: matching the feature points of the target image with pre-extracted feature points of the template image corresponding to each shooting angle, and determining the template image having the maximum matched feature points as the matched template image matching the target image;

In an alternative embodiment, when being specifically implemented, step 103 includes:

calculating feature descriptors of the template image corresponding to each shooting angle via a speed up robust features SURF algorithm;

calculating the feature descriptors of the target image via the speed up robust features SURF algorithm;

matching the feature descriptors of the target image with the feature descriptors of the template image corresponding to each shooting angle via a random sample consensus RANSAC algorithm, eliminating feature descriptors of a wrong match, and determining feature descriptors of a correct match;

determining the template image having the maximum feature descriptors of the correct match as the template image having the maximum matched feature points.

It is to be noted that in an embodiment of the present application, The feature descriptors of the currently shot target image and the feature descriptors of the template image corresponding to each shooting angle may be calculated by using the SURF algorithm, and then the feature descriptors of the target image is matched with the feature descriptors of the template image corresponding to each shooting angle, the SURF algorithm may be used to achieve that the extraction time of the feature point is greatly shortened, thereby improving the real-time performance of the detection of the feature point.

Figure 3:
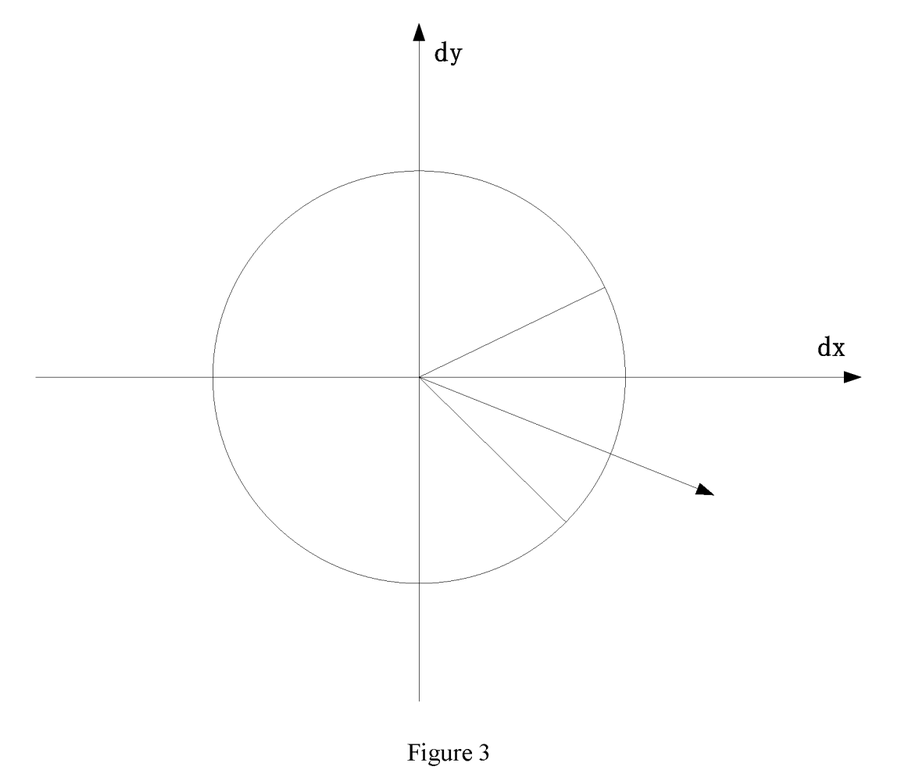
FIG. 3 is a diagram of a circular area with a radius of 3 and the center of a characteristic point of the present application.
Figure 4:
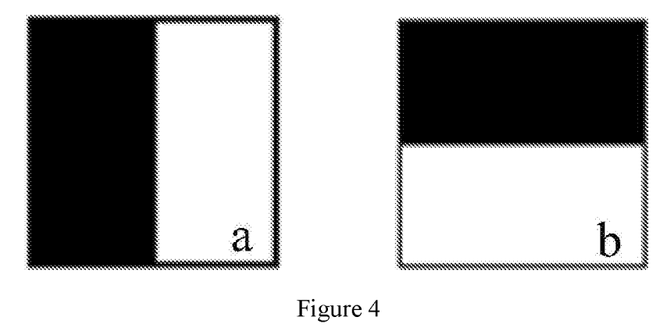
FIG. 4 is a Haar Wavelet response filter in the x direction (a) and y direction (b) of the present application.

In the present embodiment, the specific procedure for establishing the feature descriptors by using the SURF algorithm includes:

First, calculating the direction of the feature point, the direction of the feature point is calculated based on the circle with the center of the feature point and the radius of 3, for example, for a circular area with the center of the feature point and the radius of 3, a sector of which the central angle is $$\frac{\pi}{3}$$

rotated around the center of the circle, each rotation is 15° to obtain 24 sectors, as shown in FIG. 3; Haar Wavelet response of which each point is in x-axis direction and Haar Wavelet response of which each point is in y-axis direction are calculated by using a filter with a side length of 2, as shown in FIG. 4, Haar Wavelet response in the x-axis direction and Haar Wavelet response in the y-axis direction are weighted by a second-order Gaussian function value centered on the feature point, and Haar Wavelet response in the x-axis direction and Haar Wavelet response in the y-axis direction which are weighted are taken as a horizontal response along the x-axis direction of the abscissa and a vertical response along the y-axis direction of the ordinate in a sector of the points in the sector respectively; the horizontal and vertical responses of all the points in each sector are added respectively to obtain a local vector, in the 24 sectors, the longest local vector is the direction of the feature point, and a beat angle of the feature point is marked as θ.

Secondly, establishing a descriptor, the feature point is taken as the center, 9×9 areas are selected to be divided into nine 3×3 subareas, each subarea is calculated to obtain four data to produce a 36-dimensional vector as the feature descriptors, specifically:

1. The feature point is taken as the center, and 9×9 areas are selected to be divided into nine 3×3 subareas, 2. Haar Wavelet response $hx_{i,j}$ in the horizontal direction and Haar Wavelet response $hy_{i,j}$ in the vertical direction of each subarea are respectively calculated by using the filter with the length of 2, where i=1, 2 . . . 4, j=1, 2 . . . 9, Haar Wavelet response $hx_{i,j}$ in the horizontal direction and Haar Wavelet response $hy_{i,j}$ in the vertical direction are weighted by the second order Gaussian function value centered on the feature point, Haar Wavelet response $hX_{i,j}$ in the horizontal direction and Haar Wavelet response $hY_{i,j}$ in the vertical direction which are weighted are obtained, Haar Wavelet response $hx_{i,j}$ in the horizontal direction and the vertical Haar Wavelet response $hy_{i,j}$ in the vertical direction are rotated and transformed respectively to obtain the components $d_{i,j}'^x$ and $d_{i,j}'^y$, in the direction of the feature point, the rotation transformation formula is: $d_{i,j}'^x = w((-h_{i,j}^x \times \sin\theta) + h_{i,j}^y \times \cos\theta)$, $d_{i,j}'^y = w((h_{i,j}^y \times \cos\theta) + h_{i,j}^x \times \sin\theta)$, wherein, w is the second-order Gaussian weight value centered on the feature point, θ is the direction angle of the feature point;

3. For each subarea, calculating the followings respectively:

$\Sigma_{i=1}^{4} d_{i,j}'^x$, $\Sigma_{i=1}^{4} d_{i,j}'^y$, $\Sigma_{i=1}^{4} |d_{i,j}'^x|$, $\Sigma_{i=1}^{4} |d_{i,j}'^y|$, each subarea generates one 4-dimensional description vector: $\vec{V} = (\Sigma d_{i,j}'^x, \Sigma d_{i,j}'^y, \Sigma |d_{i,j}'^x|, \Sigma |d_{i,j}'^y|)$, Descriptive vectors generated by 9 subareas are connected to obtain a descriptive vector with the length of 36, which is a 36-dimensional descriptor.

It is to be noted that in an embodiment of the present application, RANSAC algorithm may be used to give the matching quality for the feature points to array the matching quality from high to low, the feature point with high quality is preferably combined to calculate a sample of a model, instead of random selection, the feature point with the high quality has the high probability of obtaining a correct model, thereby greatly reducing the number of iterations of RANSAC algorithm, hence greatly increasing the speed of eliminating the wrong feature point and greatly improving the calculation speed of RANSAC algorithm, therefore, the time required for matching the feature points is further reduced, and the real-time performance of the matching of the feature points is further improved.

104: determining the shooting angel corresponding to the matched template image as the shooting angle of the currently shot target image;

That is, if the currently shot target image is most matched with one of the beforehand set template images, the shooting angle corresponding to the most matching template image is the shooting angle of the currently shot target image.

105: if the shooting angel of the currently shot target image does not coincide with the preset shooting angle of the target, the tracking device is moved to track and shoot the target, so that the shooting angel of the target coincides with the preset shooting angle of the target.

Figure 5:
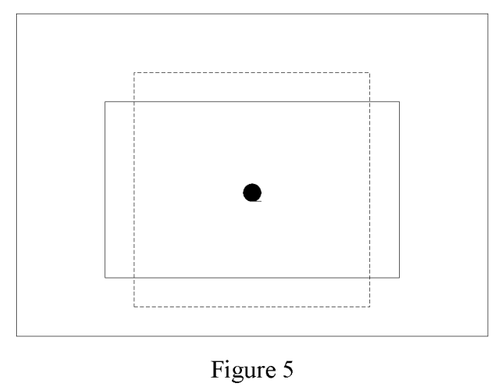
FIG. 5 is a diagram of a first position area and a second position area of the present application.

It is to be noted that in an embodiment of the present application, in order to realize the tracking and shooting of the target by a mobile tracking device, it is necessary to preset the position area of the target image in a screen of the tracking device when the shooting effect of the target image is optimal (the position area indicated by a solid frame of FIG. 5 is a first position area) and determine the current position area of the currently shot target image on a screen of the tracking device (i.e., the position area indicated by a dashed frame of FIG. 5 is a second position area).

The arrangement of the first position area includes: presetting the first position area of the target image on the screen of the tracking device according to each shooting parameter of the tracking device, so that the shooting effect of the target image is optimal when the target image is located in the first position area.

The determination of the second location area includes: comparing the feature point of the target image with the feature point of the matched template image, determining a matched feature point located in the upper left corner and a matched feature point located in the lower right corner; taking as a diagonal line of the second position area a straight line between the matched feature point located at the upper left corner and the matched feature point located in the lower right corner, and determining the second position area as the current position area of the currently shot target image on the screen of the tracking device, wherein the shape of the second position area includes but is not limited to a quadrilateral, a center point of the diagonal line is taken as a center point of the second position area. via the above arranged first position area of achieving an optimum shooting effect of the target image, that is, via the easily and quickly determining whether the center of the second position area is in the first position area, if not, it is possible to easily and quickly move the center of the second position area to be in the first position area by moving the tracking device, greatly improving the efficiency of poisoning, tracking and shooting.

Figure 6:
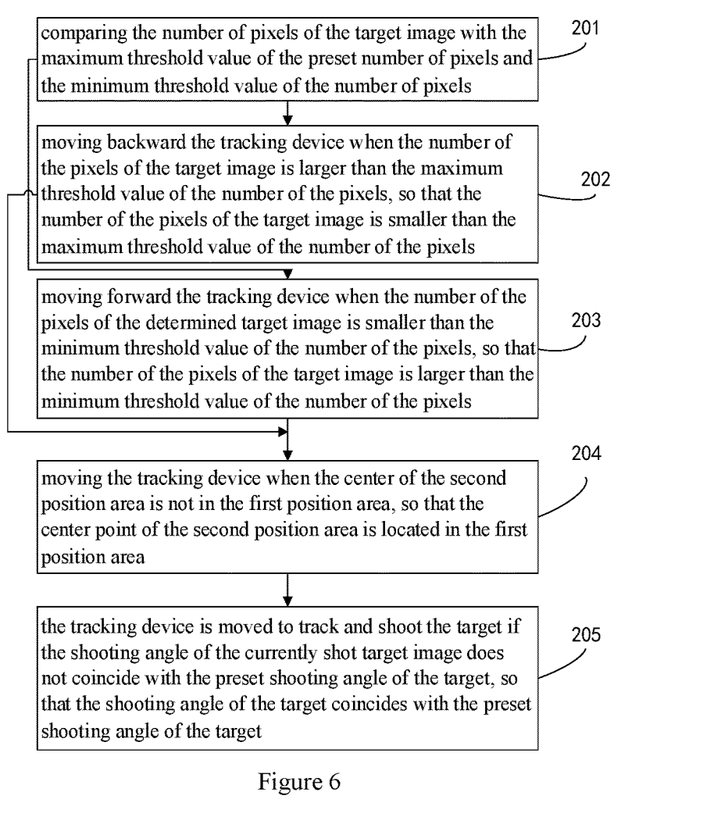
FIG. 6 is a flow diagram of a detailed implementation of step 105 in the embodiment shown in FIG. 1.

FIG. 6 is a flow diagram of a detailed implementation of step 105 in the embodiment shown in FIG. 1, in practice, in order to achieve the best shooting effect, the method further includes:

201: comparing the number of pixels of the target image with the maximum threshold value of the preset number of pixels and the minimum threshold value of the number of pixels, Optionally, step 201 includes step 202 or step 203 afterwards.

202: moving backward the tracking device when the number of the pixels of the target image is larger than the maximum threshold value of the number of the pixels, so that the number of the pixels of the target image is smaller than the maximum threshold value of the number of the pixels, or 203: moving forward the tracking device when the number of the pixels of the determined target image is smaller than the minimum threshold value of the number of the pixels, so that the number of the pixels of the target image is larger than the minimum threshold value of the number of the pixels.

Optionally, after step 202 or step 203, it is included:

204: moving the tracking device when the center of the second position area is not in the first position area, so that the center point of the second position area is located in the first position area, The tracking device is moved to the right if the center point of a second position is located on the right side of the first position area, the tracking device is moved to the left if the center point of the second position is located on the left side of the first position area.

205: the tracking device is moved to track and shoot the target if the shooting angle of the currently shot target image does not coincide with the preset shooting angle of the target, so that the shooting angle of the target coincides with the preset shooting angle of the target.

For example, if the preset shooting angle is the center shooting angle (a positive shooting angle) of the target, and the right side of the target is detected to be toward the camera, that is, the shooting angle of the currently shot target image is the shooting angle in the right side, the camera may be rotated counterclockwise on the spot, so that the shooting angle of the target coincides with the preset shooting angle of the target.

In an embodiment of the present application, firstly, the feature descriptors of the template image corresponding to each shooting angle is calculated by using the SURF algorithm, secondly, it is only necessary to calculate the feature descriptors of the currently shot target image after the match, which greatly reduces the calculation time of the detection of the real-time feature point, and then RANSAC algorithm is used to match the feature descriptors of the target image with the feature descriptors of the template image corresponding to each shooting angle, which greatly reduces the number of iterations of RANSAC algorithm, the shooting angel corresponding to the matched template image is determined as the shooting angle of the currently shot target image; finally, the tracking device is moved to track and shoot the target if the shooting angle of the currently shot target image is determine not to coincide with the preset shooting angle of the target, so that the shooting angle of the target coincides with the preset shooting angle of the target, therefore, this may greatly reduce the calculation amount of the detection and matching of the feature point during the real-time tracking and shooting, may achieve the shorter time required by the detection and matching of the feature point, and improves the real-time performance of the tracking and shooting.

Figure 7:
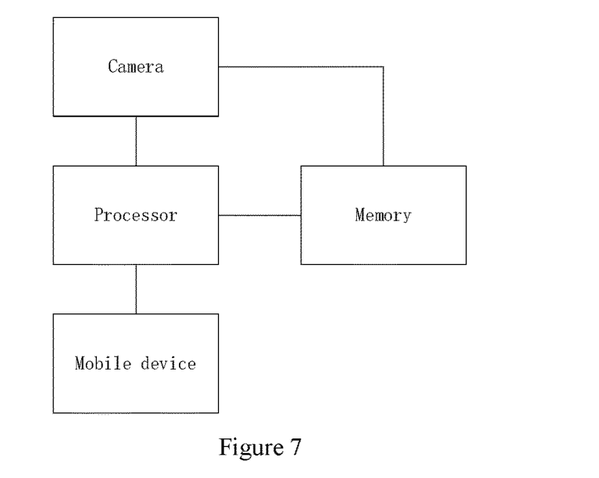
FIG. 7 is a structural diagram of a tracking device provided in an embodiment of the present application.

FIG. 7 is a structural diagram of a tracking device provided in an embodiment of the present application, the tracking device is used for tracking and shooting the moving target, as shown in FIG. 7, the tracking device specifically includes a camera for shooting the target image and further includes a processor and a memory;

The memory is used for storing a program for supporting the tracking device to perform the method for tracking and shooting the moving target, the program includes one or more computer instructions, the one or more computer instructions are invoked and executed by the processor;

When the processor is configured to execute the program stored in the memory, the following steps may be performed:

extracting the feature point of the currently shot target image; matching the feature point of the target image with the pre-extracted feature point of the template image corresponding to each shooting angle, determining the template image having the maximum matched feature points as the template image matching the target image, determining the shooting angel corresponding to the matched template image as the shooting angle of the currently shot target image, sending a movement instruction to a mobile device if the shooting angle of the currently shot target image does not coincide with the preset shooting angle of the target; enabling the mobile device to move the tracking device to track and shoot a target according to the movement instruction, so that the shooting angle of the target coincides with the preset shooting angle of the target.

Optionally, in the embodiment, the camera preliminarily shoots the target from a plurality of the shooting angles to obtain the template image corresponding to the shooting angle;

The processor extracts the feature point of the template image corresponding to each shooting angle;

The memory stores the template image corresponding to each shooting angle and the corresponding feature point.

Optionally, in the embodiment, when the processor is configured to execute the program stored in the memory, the following steps may further be performed:

Calculating the feature descriptors of the template image corresponding to each shooting angle via the speed up robust features SURF algorithm; calculating the feature descriptors of the target image via the speed up robust features SURF algorithm; matching the feature descriptors of the target image with the feature descriptors of the template image corresponding to each shooting angle via the random sample consensus RANSAC algorithm, eliminating the feature descriptors of the wrong match, determining the feature descriptors of the correct match; and determining the template image having the maximum feature descriptors of the correct match as the template image having the maximum matched feature points.

Optionally, in the embodiment, the memory also stores a first position area of the target image on a screen of the tracking device, the target image is preset according to the shooting parameters of the tracking device, the first position area is a position area in which the shooting effect of the target image is optimal.

The processor compares the feature point of the target image with the feature point of the matched template image, determines the matched feature point located in the upper left corner and the matched feature point located in the lower right corner; takes the straight line between the matched feature point located in the upper left corner and the matched feature point located in the lower right corner as the diagonal line of the second position area, determines the second position area of which the shape includes the quadrilateral, and takes the center point of the diagonal line as the center point of the second position area, wherein the second position area is the current position area of the target image on the screen of the tracking device.

Optionally, in the embodiment, when the processor is configured to execute the program stored in the memory, the following steps may further be performed:

Comparing the number of pixels of the target image with the preset maximum threshold value of the number of pixels and the preset minimum threshold value of the number of pixels, and sending the moving instruction to the tracking device when determining that the number of the pixels of the target image is larger than the maximum threshold value of the number of the pixels; therefore, the mobile device moves the tracking device backward according to the movement instruction, so that the number of the pixels of the target image is smaller than the maximum threshold value of the number of the pixels, and/or Comparing the number of pixels of the target image with the preset maximum threshold value of the number of pixels and the preset minimum threshold value of the number of pixels, sending the moving instruction to the tracking device when determining that the number of the pixels of the target image is smaller than the minimum threshold value of the number of the pixels; enabling the mobile device to move the tracking device forward according to the movement instruction, so that the number of the pixels of the target image is larger than the minimum threshold value of the number of the pixels, and/or Sending the move instruction to the mobile device when the center point of the second position area is not within the first position area; enabling the mobile device to move the tracking device according to the movement instruction, so that the center point of the second position area is located in the first position area, The device described in the embodiments of the present application may carry out the method shown in FIG. 1, and the realization principle and the technical effect will not be described again.

An embodiment of the present application also provides a computer storage medium for storing computer software instructions used for the tracking and shooting of the moving target by the tracking device shown in FIG. 7.

An embodiment of the device described above is merely illustrative, and a unit described as a separation element may or may not be physically separated, and the element shown as the unit may or may not be a physical unit, that is, the element may be located in one place, or may be distributed to multiple network units. The part or all of the modules may be selected according to the actual needs to achieve the objective of the solution of the present embodiment. Those skilled in the art will understand and practice without paying creative work.

With the description of the above embodiments, it will be apparent to those skilled in the art that the embodiments may be realized by means of software plus the necessary general hardware platform, and may of course be implemented by hardware. Based on this understanding, the above-mentioned technical solutions, in essence, or for those that contribute to the prior art, may be embodied in the form of a software product. The computer software product may be stored in a computer readable storage medium, such as ROM/RAM, a disk, an optical disk, etc., and includes a plurality of instructions for causing a computer device (which may be a personal computer, a server, or a network device, etc.) to carry out the method described in each embodiment or some part of the embodiments.

Finally, it should be noted that the above embodiments are merely illustrative of the technical solutions of the present application and are not intended to be limiting thereof, although the present application has been described in detail with reference to the foregoing embodiments, it will be understood by those skilled in the art that it is still possible to modify the technical solutions recited in the foregoing embodiments or to equivalently replace some of the technical features therein; and such modifications or substitutions do not make the essence of the corresponding technical solutions depart from the spirit and scope of the technical solutions of the various embodiments of the present application.

The invention claimed is:

1. A method for tracking and shooting a moving target, comprising:
    extracting feature points of a currently shot target image;
    matching the feature points of the target image with pre-extracted feature points of a template image corresponding to each shooting angle, determining the template image having the maximum matching feature points as a matched template image matching the target image;

determining a shooting angle corresponding to the matched template image as the shooting angle of the currently shot target image; and if the shooting angle of the currently shot target image does not coincide with the preset shooting angle of the target, moving tracking device to track and shoot the target, so that the shooting angle of the target coincides with the preset shooting angle of the target.

2. The method according to claim 1, wherein before the matching the feature points of the target image with pre-extracted feature points of the template image corresponding to each shooting angle, the method comprises:

shooting the target from a plurality of the shooting angles in advance;

obtaining the template image corresponding to each shooting angle; and extracting the feature points of the template image corresponding to each shooting angle.

3. The method according to claim 1, wherein the matching the feature points of the target image with the pre-extracted feature points of the template image corresponding to each shooting angle comprises:

calculating feature descriptors of the template image corresponding to each shooting angle via a speed up robust features SURF algorithm;

calculating the feature descriptors of the target image via the speed up robust features SURF algorithm;

matching the feature descriptors of the target image with the feature descriptors of the template image corresponding to each shooting angle via a random sample consensus RANSAC algorithm;

eliminating feature descriptors of a wrong match;

determining feature descriptors of a correct match; and determining the template image having the maximum feature descriptors of the correct match as the matched template image having the maximum matched feature points.

4. The method according to claim 1, wherein the method further comprises:

presetting a first position area of the target image on a screen of the tracking device according to each shooting parameter of the tracking device, so that the shooting effect of the target image is optimal when the target image is located in the first position area; and determining a second position area, the second position area being the current position area of the target image on the screen of the tracking device.

5. The method according to claim 1, wherein the method further comprises:

comparing the feature points of the target image with the feature points of the matched template image;

determining a matched feature point located in an upper left corner and a matched feature point located in a lower right corner;

taking a straight line between the matched feature point located in the upper left corner and the matched feature point located in the lower right corner as a diagonal line of an second position area, to determine the second position area of which the shape comprises a quadrilateral; and taking the center point of the diagonal line as the center point of the second position area.

6. The method according to claim 1, wherein the method further comprises:

comparing the number of pixels of the target image with the preset maximum threshold value of the number of pixels and the preset minimum threshold value of the number of pixels;

moving backward the tracking device when determining that the number of the pixels of the target image is larger than the maximum threshold value of the number of the pixels; and moving forward the tracking device when determining that the number of the pixels of the target image is smaller than the minimum threshold value of the number of the pixels, so that the number of the pixels of the target image is smaller than the maximum threshold value of the number of the pixels and is larger than the minimum threshold value of the number of the pixels.

7. The method according to claim 6, wherein after moving the tracking device backward or forward, the method further comprises:

moving the tracking device such that the center point of the second position area is located within the first position area, when the center point of the second position area is not within the first position area, including:

moving the tracking device to the right if the center point of a second position is located on the right side of the first position area; and moving the tracking device to the left if the center point of the second position is located on the left side of the first position area.

8. A tracking device for tracking and shooting a moving target, comprising:

a camera for shooting a target image;

a processor; and a memory that is used for storing a program for supporting the tracking device to perform a method for tracking and shooting a moving target, the program including one or more computer instructions that are configured to be invoked and executed by the processor;

wherein, when the processor is configured to execute the program stored in the memory, the following steps may be performed:

extracting feature points of a currently shot target image;

matching the feature points of the target image with pre-extracted feature points of a template image corresponding to each shooting angle;

determining the template image having the maximum matched feature points as a matched template image matching the target image;

determining a shooting angle corresponding to the matched template image as a shooting angle of the currently shot target image;

sending a movement instruction to a mobile device if the shooting angle of the currently shot target image does not coincide with the preset shooting angle of the target; and enabling the mobile device to move the tracking device to track and shoot a target according to the movement instruction, so that the shooting angle of the target coincides with the preset shooting angle of the target.

9. The device according to claim 8, wherein:

the camera preliminarily shoots the target from a plurality of the shooting angles to obtain the template image corresponding to the shooting angle;

the processor extracts the feature points of the template image corresponding to each shooting angle; and the memory stores the template image corresponding to each shooting angle and the corresponding feature points.

10. The device according to claim 8, wherein, when the processor is configured to execute the program stored in the memory, the following steps may further be performed:
calculating feature descriptors of the template image corresponding to each shooting angle via a speed up robust features SURF algorithm;
calculating the feature descriptors of the target image via the speed up robust features SURF algorithm;
matching the feature descriptors of the target image with the feature descriptors of the template image corresponding to each shooting angle via a random sample consensus RANSAC algorithm;
eliminating a descriptor of a feature point of a wrong match;
determining feature descriptors of a correct match; and
determining the template image having the maximum feature descriptors of the correct match as the matched template image having the maximum matched feature points.

11. The device according to claim 8, wherein:
the memory also stores a first position area and a second position area of the target image on a screen of the tracking device;
the first position area being preset according to the shooting parameters of the tracking device;
the first position area being a position area in which the shooting effect of the target image is optimal; and
the second position area being the current position area of the target image on the screen of the tracking device.

12. The device according to claim 8, wherein the processor:
compares the feature points of the target image with the feature points of the matched template image;
determines a matched feature point located in the upper left corner and a matched feature point located in the lower right corner;
takes a straight line between the matched feature point located at the upper left corner and the matched feature point located in the lower right corner as a diagonal line of the second position area; and
determines the second position area of which the shape comprises a quadrilateral, and takes the center point of the diagonal line as the center point of the second position area.

13. The device according to claim 8, wherein, when the processor is configured to execute the program stored in the memory, the following steps may further be performed:
comparing the number of pixels of the target image with the preset maximum threshold value of the number of pixels and the preset minimum threshold value of the number of pixels;
sending the moving instruction to the tracking device when determining that the number of the pixels of the target image is larger than the maximum threshold value of the number of the pixels;
enabling the mobile device to move the tracking device backward according to the movement instruction, so that the number of the pixels of the target image is smaller than the maximum threshold value of the number of the pixels;
sending the moving instruction to the tracking device when determining that the number of the pixels of the target image is smaller than the minimum threshold value of the number of the pixels; and
enabling the mobile device to move the tracking device forward according to the movement instruction, so that the number of the pixels of the target image is smaller than the maximum threshold value of the number of the pixels and is larger than the minimum threshold value of the number of the pixels.

14. The device according to claim 13, wherein, when the processor is configured to execute the program stored in the memory, the following steps may further be performed:
sending the move instruction to the mobile device when the center point of the second position area is not within the first position area; and
enabling the mobile device to move the tracking device according to the movement instruction, so that the center point of the second position area is located in the first position area, wherein the tracking device is moved to the right if the center point of a second position is located on the right side of the first position area, and the tracking device is moved to the left if the center point of the second position is located on the left side of the first position area.

15. A non-transitory computer readable storage medium, including computer-executable instructions for execution on a tracking device, such that when the computer-executable instructions are executed by the device a method is performed, comprising:
extracting feature points of a currently shot target image;
matching the feature points of the target image with pre-extracted feature points of a template image corresponding to each shooting angle;
determining the template image having the maximum matching feature points as a matched template image matching the target image;
determining a shooting angle corresponding to the matched template image as the shooting angle of the currently shot target image; and
if the shooting angle of the currently shot target image does not coincide with the preset shooting angle of the target, moving the tracking device to track and shoot the target, so that the shooting angle of the target coincides with the preset shooting angle of the target.

\* \* \* \* \*